United States Patent [19]
Granberg et al.

[11] Patent Number: 6,128,503
[45] Date of Patent: Oct. 3, 2000

[54] METHOD AND APPARATUS FOR COORDINATING MOBILE COMMUNICATIONS NETWORK SERVICES WITH INTELLIGENT NETWORK SERVICES

[75] Inventors: Christer Granberg; Friedrich Eltester, both of Stockholm, Sweden

[73] Assignee: Telefonaktiebolaget LM Ericsson, Stockholm, Sweden

[21] Appl. No.: 08/986,387

[22] Filed: Dec. 8, 1997

[51] Int. Cl.[7] .................................................. H04Q 7/22
[52] U.S. Cl. ............................................ 455/461; 455/433
[58] Field of Search ..................................... 455/461, 433, 455/426, 410, 11, 432, 435, 414, 422; 379/220

[56] References Cited

U.S. PATENT DOCUMENTS

| | | | |
|---|---|---|---|
| 5,353,331 | 10/1994 | Emery et al. ............................ | 455/461 |
| 5,457,736 | 10/1995 | Cain et al. ............................... | 455/461 |
| 5,566,235 | 10/1996 | Hetz ......................................... | 379/201 |
| 5,793,762 | 8/1998 | Penners et al. ......................... | 455/461 |
| 5,835,583 | 11/1998 | Hetz et al. ............................... | 379/220 |
| 5,841,854 | 11/1998 | Schumacher et al. .................. | 379/265 |
| 5,862,490 | 1/1999 | Sasuta et al. ........................... | 455/433 |
| 5,901,352 | 4/1999 | St-Pierre et al. ........................ | 455/426 |
| 5,901,359 | 5/1999 | Malmstrom ............................. | 455/461 |
| 5,903,639 | 5/1999 | Lipchock et al. ....................... | 379/220 |
| 5,905,958 | 5/1999 | Houde ..................................... | 455/437 |
| 5,909,650 | 6/1999 | Jonsson .................................. | 455/461 |
| 5,920,820 | 7/1999 | Qureshi et al. ......................... | 455/461 |

FOREIGN PATENT DOCUMENTS

| | | |
|---|---|---|
| 0 602 779 | 6/1994 | European Pat. Off. . |
| WO 9526114 | 9/1995 | WIPO .............................. H04Q 7/24 |
| 96/13949 | 5/1996 | WIPO . |
| 97/31473 | 8/1997 | WIPO . |

OTHER PUBLICATIONS

V.K. Garg et al., *IEEE Personal Communications*, vol. 4, No. 3, Jun. 1997, pp. 33–39, "Subscriber Data Management in Personal Communications Services Networks".

European Telecommunications Standards Institute (*ETSI*), TS 101 044 V5.1.0 (Aug. 1997), Techinical Specification, Digital cellular telecommunications system (Phase 2+); Customized Applications for Mobile network Enhanced Logic (CAMEL)—Stage 2, (GSM 03.78 version 5.1.0).

*Primary Examiner*—Nguyen Vo
*Assistant Examiner*—Duc Nguyen
*Attorney, Agent, or Firm*—Nixon & Vanderhye P.C.

[57] ABSTRACT

A mobile communications system provides mobile communication services from different supplementary service providers to mobile subscribers. A first database stores first subscriber information pertaining to the mobile subscribers. A first service provider provides a first supplementary service to one of the mobile subscribers using the first subscriber information stored in the first database for the mobile subscriber. A second database stores second subscriber information pertaining to subscribers. A second service provider provides a second supplementary service to the mobile subscriber using the second subscriber information stored in the second database for that mobile subscriber. The second service provider coordinates provision of the second supplementary service to the mobile subscriber using some of the first subscriber information obtained from the first database.

29 Claims, 8 Drawing Sheets

METHOD AND APPARATUS FOR COORDINATING MOBILE COMMUNICATIONS NETWORK SERVICES WITH INTELLIGENT NETWORK SERVICES

RELATED APPLICATIONS

This application is related to the following (all of which are incorporated herein by reference), U.S. patent application Ser. No. 08/912,929, entitled "Transfer of Calling Parts Identification in a Mobile Communication System," filed Aug. 15, 1997 (attorney docket 2372-4); U.S. patent application Ser. No. 08/964,212, entitled Method and Apparatus for Providing Network-Specific Mobile Services, filed Nov. 4, 1997; and U.S. patent application Ser. No. 08/971,735, entitled "Providing Notification of Location Dependent Services to Mobile Stations," filed Nov. 17, 1997.

FIELD OF THE INVENTION

The present invention relates to providing mobile communications, and more particularly, to coordinating provision of supplementary services to mobile subscribers provided by a mobile communications network and by an intelligent network.

BACKGROUND AND SUMMARY OF THE INVENTION

In mobile radio communication networks, such as cellular telephone systems, neighboring radio cells provide coverage of a geographical area to be serviced. Each cell includes a base station (BS) operating on a set of radio channels. Over such radio channels, communications are provided to and from mobile subscribers. A mobile switching center (MSC) controls calls between a group of base stations and the Public Switched Telephone Network (PSTN), the Integrated Services Digital Network (ISDN), and one or more Public Land Mobile Radio Networks (PLMN).

All mobile communication networks provide basic call services required for making and receiving calls in home and in visiting mobile communications networks. In fact, known cellular systems like the Nordic Mobile Telephone system (NMT), the Total Access Communication System (TACS), the American Digital Cellular system (ADC), the Global System for Mobile communication (GSM), and the Pacific Digital Cellular system (PDC) have adopted standard techniques for providing such basic services. In addition to connecting calls to/from individual mobile subscribers, basic services may also include services available to all mobile subscribers without requiring an individual service subscription.

Mobile communication networks typically also offer mobile subscribers the opportunity to subscribe to supplementary services. These supplementary services generally require an individual subscription. In addition to call switching, routing, and charging functions, the MSC may also be tasked with performing these supplementary services which may include for example, call waiting, call forwarding, and call barring. Supplemental service subscription information for mobile subscribers is usually stored in corresponding database records in a central database within the mobile communications network. Further, the mobile communications network operator may also store in a mobile subscriber's database record information pertaining to operator-determined or operator-initiated services such as Operator-Determined call Barring (ODB). For purposes of this description, the supplementary services for which information is stored in a mobile subscriber's database record are collectively referred to as Mobile Communications Network (MCN) supplementary services.

Recently, yet another category of services may be provided to mobile subscribers using Intelligent Networks (IN). Using standard service logic blocks, Intelligent Network-based services allow relatively fast and flexible creation and implementation of new supplementary services to subscribers. An IN database stores subscriptions for individual subscribers. To distinguish from MCN supplementary services, the term IN-based supplementary services is used in the following description.

With such a wide variety of supplementary services offered from different sources, these services may not be consistent and coordinated with each other. This leads to the possibility that a call will be handled inappropriately. One of the obstacles to attaining such consistency and coordination is that the Service Control Point (SCP) in the intelligent network, (the SCP includes the logic employed in rendered IN-based supplementary services), is unaware of the MCN subscriber information stored in the central database in the MCN. In fact, this lack of coordination/communication may even allow mobile subscribers to (intentionally or unintentionally) circumvent restrictions or other limitations placed by one supplementary service using the other supplementary service. The following example illustrates this problem.

In this example, the MCN central database stores in a particular mobile subscriber's database record an Operator-Determined call Barring (ODB) category which prohibits that mobile subscriber from making international calls or forwarding incoming calls to international destinations. A Service Control Point (SCP) in the Intelligent Network offers a call forwarding service to the same mobile subscriber independent from the MCN-based services. It is not possible for the SCP in the IN network to check the status of any operator-determined call barring service for that particular mobile subscriber in the MCN central database. As a part of the IN-based call forwarding service, the mobile subscriber indicates a desired call forward-to number. Assume the mobile subscriber registers an international number as the call forward-to number. Then the IN-based call forwarding stores an international forward-to number without the registered number being checked against the ODB service. Consequently the IN-based service, unaware that international calls are not allowed by the ODB service, sets up an international call to the call forward-to international number.

One way to prevent this kind of problem is manual checking by human operators. However, manual checking requires that the data in the MCN database be compared with the data in the IN-based database for each mobile subscriber. This is both time consuming and costly. This disadvantage is further exacerbated in that many IN-based services permit subscribers to change their subscription parameters at will. In the IN-based, call forwarding service, the mobile subscriber can change the call forward-to number as frequently as the mobile subscriber desires simply by dialing in to an automated IN-service interface and changing the call forward-to number. Frequent changes of subscriber data make the manual check ineffective since manual checks cannot realistically be performed on a continuous basis. The ability to detect circumvented service restrictions or inconsistent services is also complicated by another factor. The commercial or business entities that own various network nodes may also be different. Coordinating a manual check between such different entities can be difficult.

What is needed is a mechanism by which supplementary services delivered to mobile subscribers by different service providers can be coordinated. In addition, it would be desirable to have such service coordination to prevent inconsistent or otherwise improper delivery of supplementary services.

It is an object of the present invention to coordinate the provision of supplementary services to mobile subscribers offered by plural supplementary service providers.

It is a further object of the present invention to coordinate the provision and delivery of MCN-based and IN-based supplementary services to mobile subscribers.

It is yet another object of the present invention to prevent inconsistent or improper provision of supplementary services to mobile subscribers.

A mobile communications system provides mobile communication services from different supplementary service providers to mobile subscribers. A first database stores first subscriber information pertaining to the mobile subscribers. A first service provider provides a first supplementary service to one of the mobile subscribers using the first subscriber information stored in the first database for the mobile subscriber. A second database stores second subscriber information pertaining to subscribers. A second service provider provides a second supplementary service to the mobile subscriber using the second subscriber information stored in the second database for that mobile subscriber. The second service provider coordinates provision of the second supplementary service to the mobile subscriber using some of the first subscriber information obtained from the first database.

The first subscriber information may include mobile identification, mobile location, mobile status, mobile network operator data, and supplementary subscription information. The first subscriber information may indicate, for example, some sort of call restriction, and the second subscriber information may pertain to forwarding calls. In that situation, the second service provider uses some of the first subscriber information relating to call restrictions obtained from the first database to detect possible misuse of the second supplementary call forwarding service. The service provider may then modify the second supplementary service or not provide the second supplementary service at all.

In an example preferred embodiment of the present invention in the context of a GSM-type mobile network, the first database may be a mobile communications network (MCN) database, and the first service provider may be an MCN mobile switching center (MSC). The second service provider may be an Intelligent Network (IN) service control node that includes service logic for providing an IN-based supplementary service. More specifically, the MCN database may correspond to a Home Location Register (HLR) and the IN service control node may correspond to a Service Control Point (SCP) that also includes an IN database storing IN subscription information. Communications between the HLR and SCP may be formatted in accordance with the Mobile Applications Part (MAP) communications protocol.

A method of providing services to mobile subscribers in accordance with the invention advantageously coordinates provision of an IN-based service to a mobile subscriber using MCN subscriber information obtained from the HLR associated with that mobile subscriber. More specifically, a call involving one of the mobile subscribers is analyzed to detect a trigger of the IN-based service. The detected trigger results in IN-based service being invoked at the Service Control Point. The SCP requests from the HLR one or more parameters of the MCN subscriber information pertaining to the one mobile subscriber. The SCP analyzes the parameter (s) returned from the HLR in response to the request. In particular, the SCP determines the IN-based services consistent with the parameter(s) returned by the HLR. If the IN-based service is inconsistent with the parameter(s) returned by the HLR, the SCP modifies or does not deliver the IN-based service. Therefore, if the IN-based supplementary service is call forwarding and the MCN subscriber information corresponding to the one mobile subscriber affects call forwarding, e.g., call barring, the IN-based call forwarding service is provided using the MCN subscriber information so as to not circumvent the operator-determined call barring service.

BRIEF DESCRIPTION OF THE DRAWINGS

These and other features and advantages of the present invention are described in conjunction with the drawings of which.

DETAILED DESCRIPTION OF THE DRAWINGS

In the following description, for purposes of explanation and not limitation, specific details are set forth, such as particular embodiments, data flows, signaling implementations, interfaces, techniques, etc. in order to provide a thorough understanding of the present invention. However, it will be apparent to one skilled in the art that the present invention may be practiced in other embodiments that depart from these specific details. For example, while the present invention is sometimes described in the context of an example cellular telephone network using GSM terminology, those skilled in the art will appreciate that the present invention can be implemented in any cellular telephone system using a variety of methods for implementing supplemental mobile services. In other instances, detailed descriptions of well-known methods, interfaces, devices, and signaling techniques are omitted so as not to obscure the description of the present invention with unnecessary detail.

Figure 1:
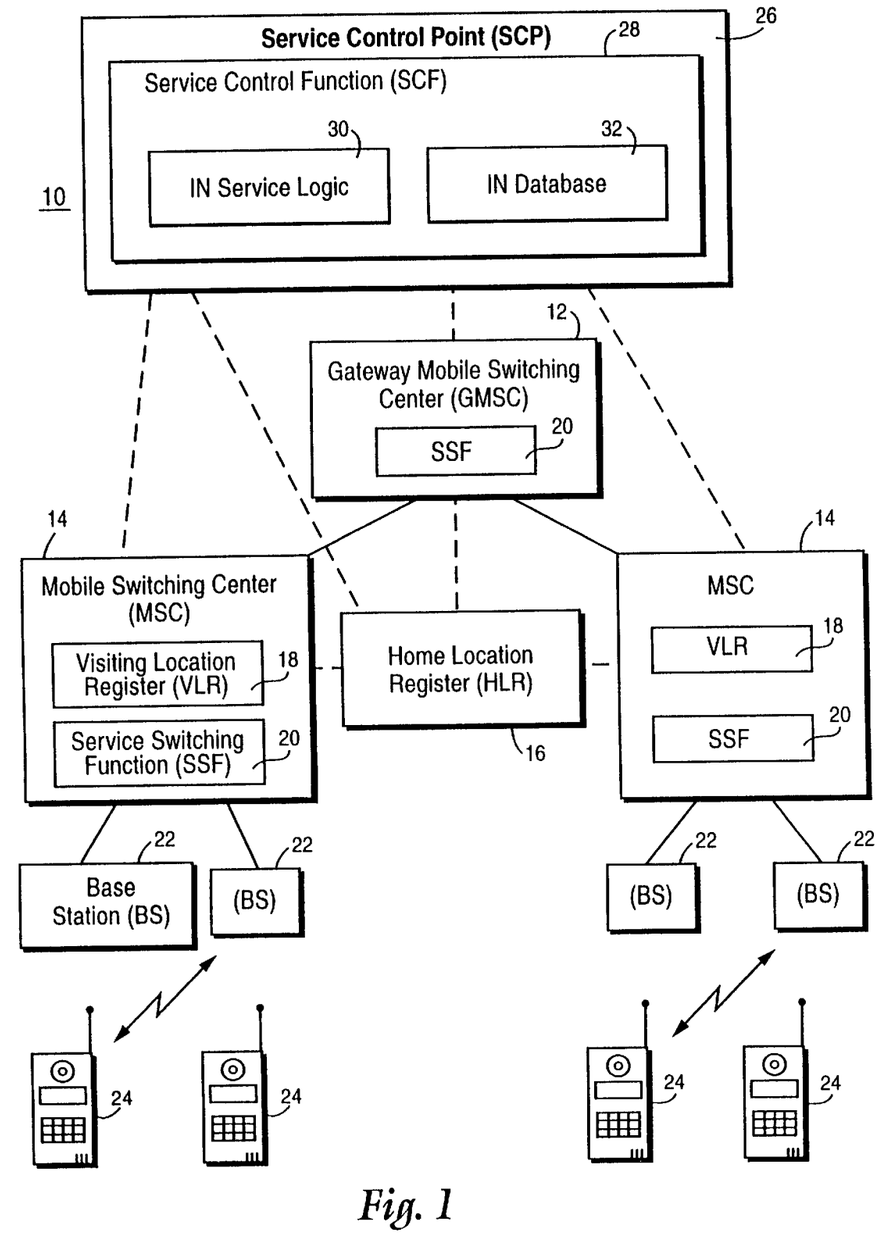
FIG. 1 is a function block diagram of an example mobile communications system in which the present invention may be employed.

FIG. 1 illustrates an example mobile communications system 10 in which the present invention may be implemented. A gateway mobile switching center (GMSC) 12 or a mobile switching center (MSC) 14 interfaces with other telecommunications networks such as the public switched telephone network (PSTN), integrated services digital network (ISDN), or a cellular network, etc. The GMSC 12, connected to one or more other MSCs 14, is the point where calls to the mobile subscribers enter the mobile communications system 10. Each mobile terminating call must therefore be routed via the GMSC 12. The GMSC 12 contains signaling functions for retrieving from a home location register (HLR) 16 information needed for a mobile call setup. Based on the results of the interrogation, the GMSC 12 identifies an MSC currently serving the called mobile station and routes the call to the serving MSC. While the GMSC 12 is shown as a separate node for clarity of illustration, it can be co-located with an MSC node.

Each MSC 14 performs telephony switching functions associated with calls involving at least one mobile or portable communications unit indicated as mobile station(s) 24 including interfacing with other telecommunications networks and routing mobile originated calls. Each mobile station includes a speaker, a display, a keypad, and a microphone as well as data processing and radio communication circuitry. Associated with each mobile switching center 14 is a visiting location register (VLR) 18 which includes a database containing temporary identification and subscriber information about all mobile stations currently located in that MSC's location area. When the mobile station enters a new location area and registers with that location area's associated MSC, the VLR associated with that MSC requests data about the mobile station from that mobile's HLR 16 and stores it. Thereafter, if the mobile station makes a call, the VLR 18 already has the information needed for call setup. While the VLR 18 may be a stand-alone node, it is preferably integrated with the MSC 14 to eliminate network signaling between the two nodes.

The HLR 16 is a database node that stores and manages subscriptions. For each home mobile subscriber, the HLR 16 stores permanent subscriber data such as a mobile station ISDN number (MSISDN) which uniquely identifies the mobile telephone subscription in the PSTN numbering plan and an international mobile subscriber identity (IMSI) which is a unique identity allocated to each subscriber and used for signaling in the mobile communications network. The HLR 16 also contains a list of services which a mobile subscriber is authorized to use along with a current subscriber location number corresponding to a VLR address.

A call intended for one of the mobile stations 24 is routed to the serving MSC/VLR which then routes the call to the base station 22 associated with the cell in which the called mobile station 24 is currently located. Using well known, established protocols and procedures, the call is forwarded over the radio interface by that base station 22 to the called mobile station 24.

The GMSC 12, HLR 16, MSC 14, VLR 18, BS 22, and MSs 24 are some of the basic elements in a GSM-type Mobile Communications Network (MCN). Those skilled in the art will of course recognize that the present invention is applicable to any mobile communications network. In addition, FIG. 1 shows entities which belong, at least conceptually, to an intelligent network which is distinct from the mobile communications network. The intelligent network includes service control point (SCP) 26 which includes a service control function (SCF) 28 encompassing IN service logic 30 and an IN database 32. The MSCs 14 and GMSC 12 include an IN service switching function (SSF) 20 that interfaces the MSCs 14 and the GMSC 12 to the service control point 26. The service switching function performs well known, IN triggering functions at various call processing points referred to as trigger points or detection points. The Intelligent Network is just an example of a supplementary mobile services provider other than the MCN.

The SCF 28 includes an interface with the HLR 16. In GSM, this interface may be use d to retrieve the location and status (idle , busy or not reachable) of a subscriber from the HLR 16 (and MSC 14 via the HLR 16). See for example the GSM phase 2+ functionality Customized Applications for Mobile network Enhanced Logic (CAMEL), 03.78, version 5.1.0.

Using the definitions set forth in the background section above, the present invention coordinates between MCN-based supplementary services and IN-based supplementary services to mobile subscribers. This coordination (1) facilitates efficient and effective delivery of supplementary services and (2) prevents the delivery of inconsistent or improper services. Although the present invention applies to any two (or more) supplementary mobile service providers, for purposes of description only, the MSCs 14 provide MCN-based supplementary services using information stored in the HLR 16 and VLR 18, and the SCP 26 provides IN-based supplementary services using the IN service logic 30, subscriber information in the IN database 32, and subscriber information stored in the HLR 16 Of course, the MSC may also provide MCN based supplementary services using subscriber services using subscriber information in the VLR and in the IN database 32.

Figure 2:
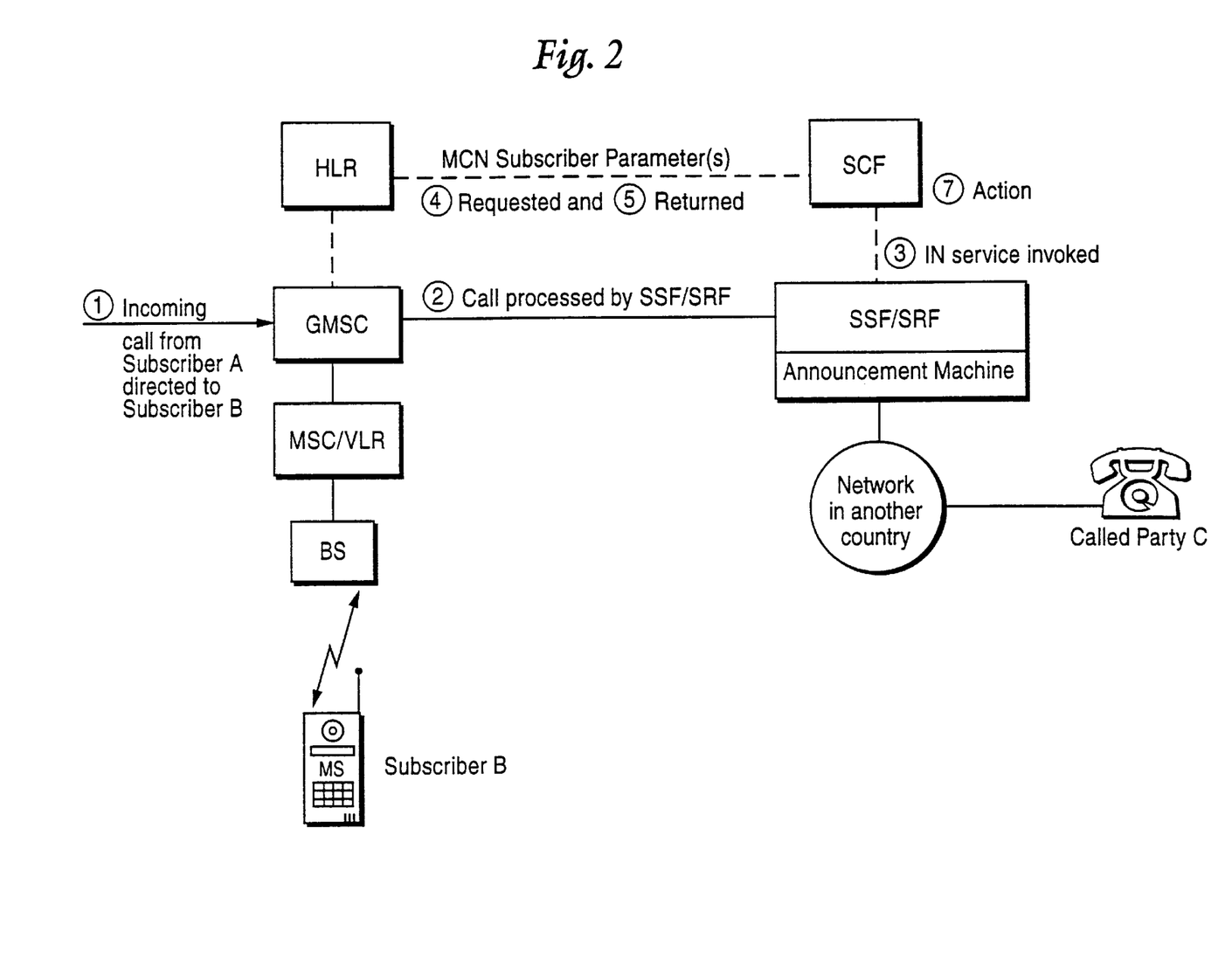
FIG. 2 is a function block diagram illustrating example procedures in accordance with the present invention.

Coordination of supplemental mobile services is described in conjunction with the simplified function block diagram shown in FIG. 2. A call initiated from subscriber A directed to the mobile station (MS) identified as subscriber B is indicated at reference numeral 1. There is a database record corresponding to subscriber B in both the HLR 16 and the IN database 32. The call is routed in the GMSC upon detection of an appropriate IN trigger/detection point to the service switching function (SSF) (shown in FIG. 2 as a separate node for purposes of illustration) as indicated at reference numeral 2. The service switching function may be associated with a service resource function (SRF). In response to detection of an IN trigger/detection point, the SSF sends a message to the SCF, as indicated at reference numeral 3, to invoke the IN service. The SCF employs the appropriate IN service logic 30 and subscriber information from the IN database 32 to render the corresponding IN-based service.

As part of the service invocation, the SCF sends a message to the HLR, indicated at reference numeral 4, requesting one or more MCN subscriber parameters stored in subscriber A's database record. The HLR returns the requested one or more MCN subscriber parameters as indicated at reference numeral 5. The SCP then analyzes the returned MCN subscriber parameters to determine if there is any inconsistency or impropriety in rendering the triggered IN-based service in view of the analyzed MCN subscriber parameters.

If the SCF determines that the requested IN-based service is consistent with the returned MCN subscription parameter(s), the service is rendered as indicated at reference numeral 7. Using the earlier example, the SCF may instruct the SSF to forward a call from subscriber A to a call forward-to international number corresponding to subscriber C located in another country. On the other hand, if a returned MCN subscription parameter indicates that international calls made by subscriber B should be barred, the SCF action indicated at reference numeral 7 would be to block the forwarding of the call to subscriber C. A third action that may be taken by the SCF is to modify the IN-based service, based on the returned MCN subscription parameter(s), and then render it in the modified form.

Figure 3:
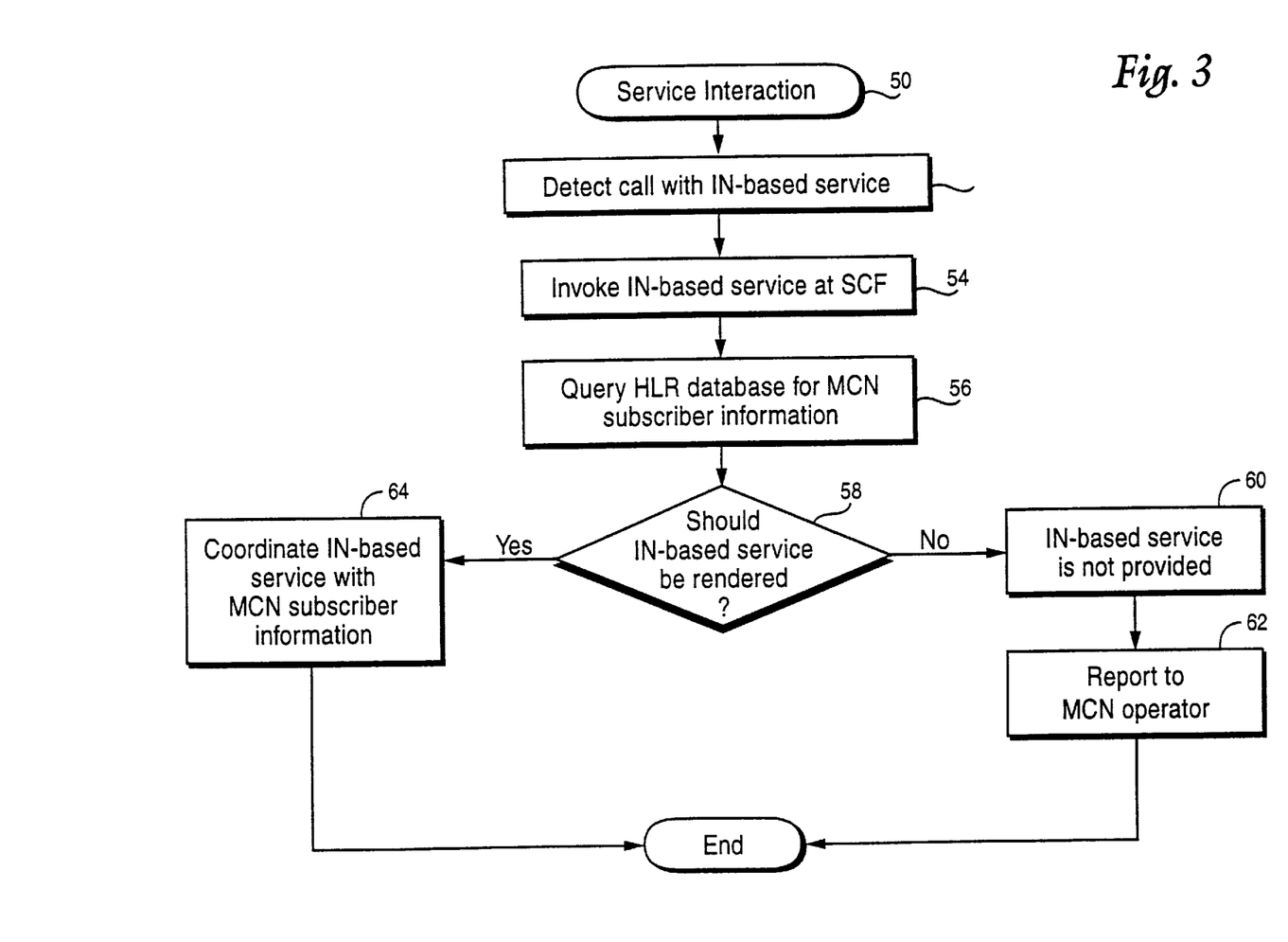
FIG. 3 is a flowchart diagram illustrating service interaction procedures.

FIG. 3 shows a flowchart diagram outlining steps for implementing a service interaction routine (block 50) in accordance with an example embodiment of the present invention. The service switching function detects when a call is associated with an IN-based service subscribed to by subscriber A (block 52). The subscriber switching function invokes the corresponding IN-based service at the SCF (block 54). The SCF then queries the HLR for MCN subscriber information that may be relevant to the requested IN-based service (block 56). A decision is made based on an analysis of the returned MCN subscriber information whether the IN-based service should be rendered (block 58). If not, the SCF does not provide the IN-based service (block 60), and a report alerting the MCN operator of this fact is made (block 62). The network operator may then further investigate and otherwise remedy the situation. On the other hand, if the decision is that the IN-based service should be rendered, the SCF coordinates the IN-based service with the MCN subscriber information (block 64). The IN-based service may be provided as is without modification or in some modified form so that it is consistent with any corresponding MCN supplementary service or MCN supplementary service restriction in effect within the MCN.

Figure 4:
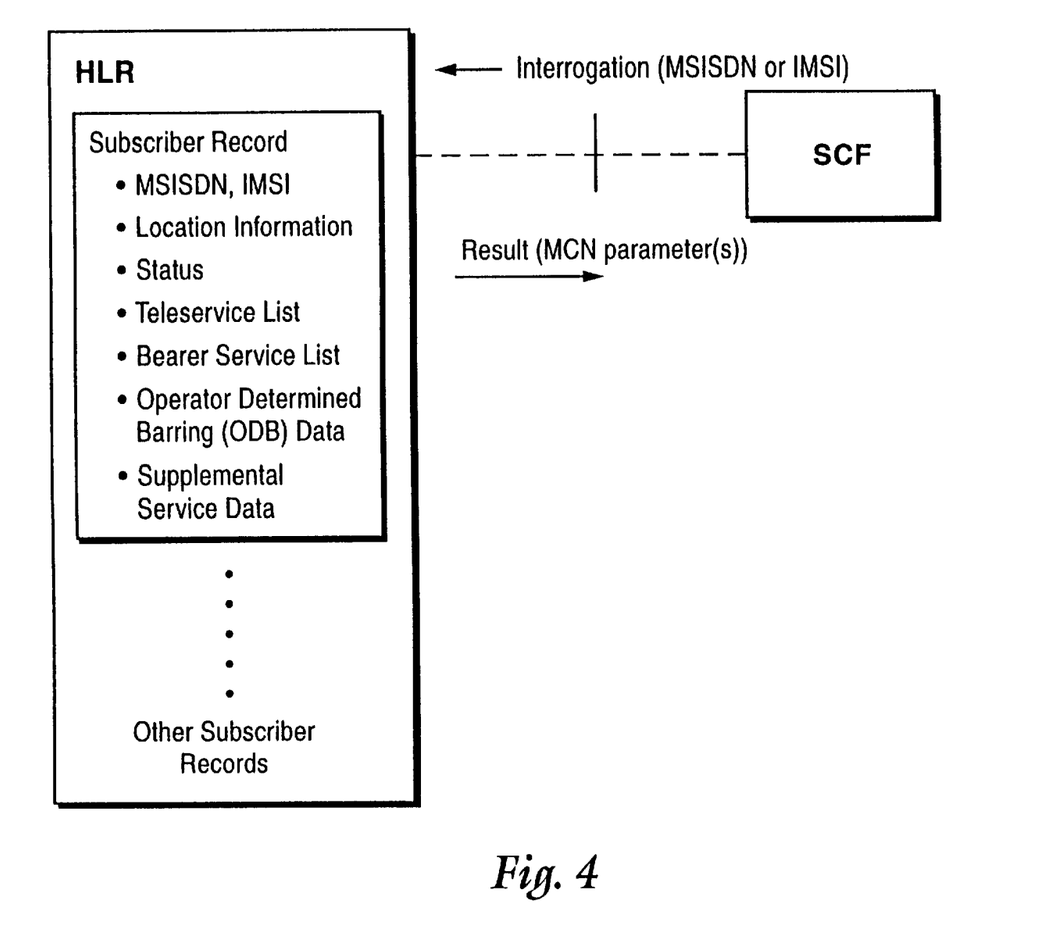
FIG. 4 shows an example data structure of the HLR database and an example communications interface between the HLR and the IN service control function (SCF)

FIG. 4 illustrates an example subscriber record in the HLR and a protocol interface for communications between the HLR and the SCF. Each subscriber record includes MCN subscriber parameters such as mobile identifying data like the MSISDN and IMSI numbers, mobile subscriber location information, mobile subscriber status, a teleservice list, bearer service list, operator-determined barring (ODB) data, supplemental service data, etc. The location information identifies the current MSC/VLR at which the mobile station is currently registered. The status indicates whether the mobile station is operational (i.e., power is on) or non-operational (i.e., power is off). The teleservice list defines certain types of subscriptions for the mobile subscriber such as voice only service, voice and facsimile service, short message service (SMS) service, etc. The bearer service list defines subscription parameters relating to data services such as the rate at which data is to be transferred, e.g., 9.6 kbps, 2.4 kbps, 1.4 kbps, etc. The teleservice list and bearer service list typically relate to ISDN-type services. The operator-determined barring (ODB) data is an example of an operator-initiated restriction applicable to a particular subscriber. Operator-initiated services may also be included. Supplemental service data defines supplemental services under the control of the subscriber such as call forwarding, call waiting, call barring, etc. In these subscriber controlled services, the subscriber determines whether the services are active/inactive and provides controlling inputs such as which numbers calls are forwarded to, which numbers are barred, etc.

In the example in FIG. 4, the SCF interrogation sent to the HLR includes a mobile station identifier such as the MSISDN or the IMSI and preferably one or more parameters that may identify specific subscriber parameters of interest to the SCF, e.g., a request for ODB data when the IN service is call forwarding. In response to the interrogation, the HLR returns a result with one or more MCN subscriber record parameters. In this example, the interrogation and result are transferred between the SCF and HLR using the Mobile Application Protocol (MAP) Any Time Interrogation (ATI) message either by using an extension mechanism of the MAP protocol which allows for the addition of specific information fields or by enhancing the ATI standard message to support the transfer of particular information parameters. Of course, any suitable communications transfer or protocol may be employed.

Figure 5:
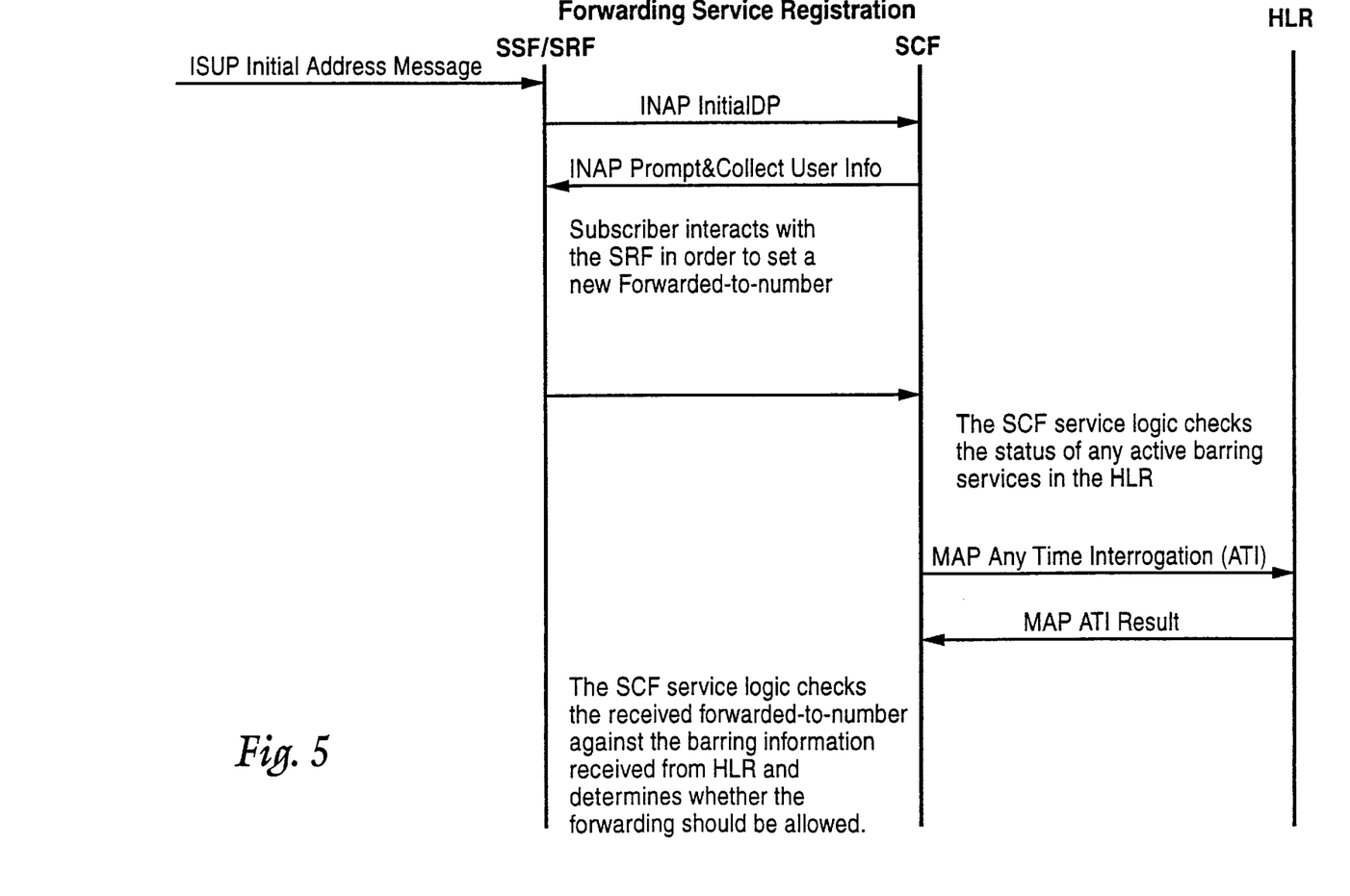
FIG. 5 is a signal flow showing a call forwarding service registration operation example in accordance with the present invention.
Figure 6:
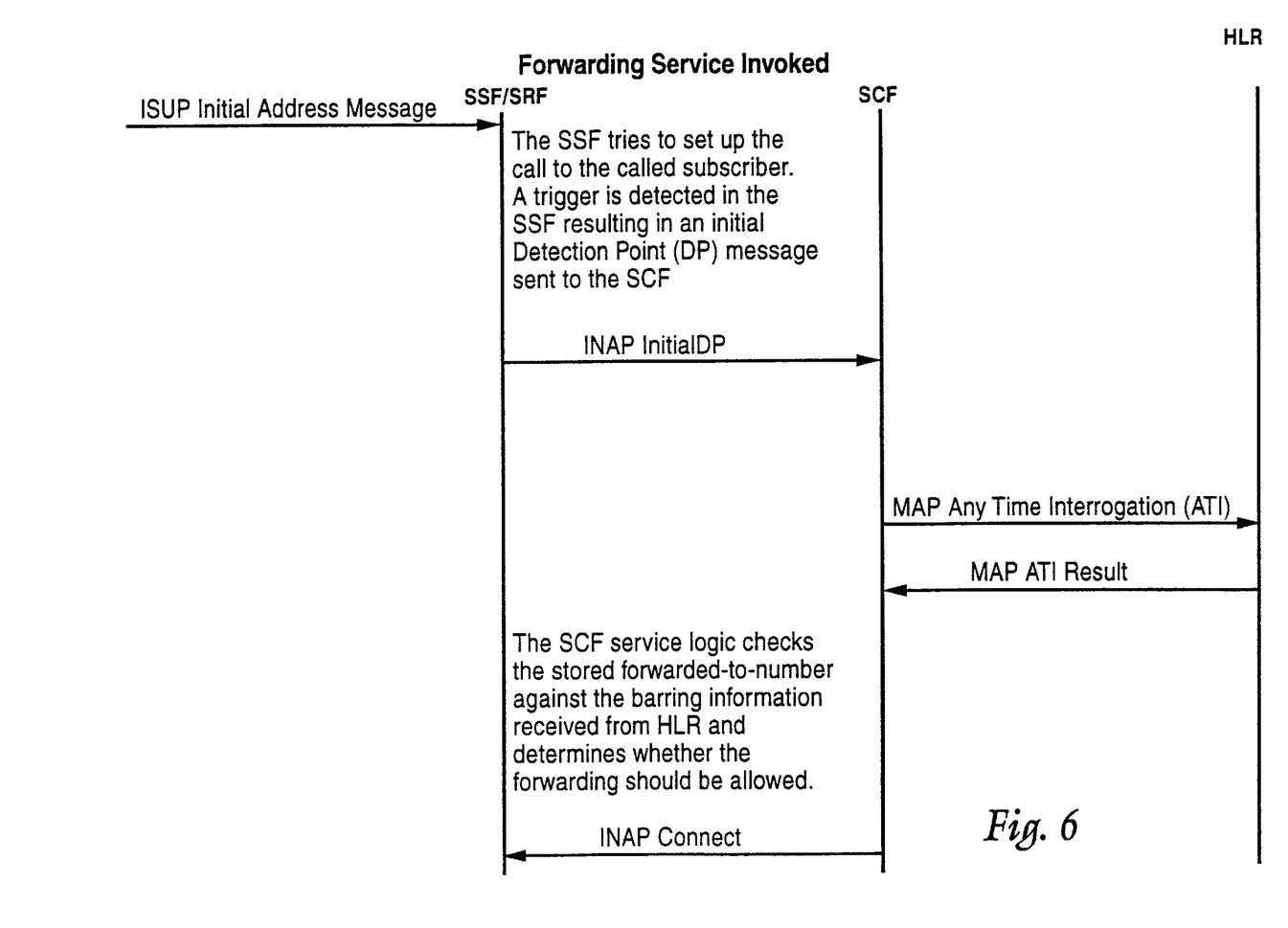
FIG. 6 is a signal flow showing a call forwarding service example in accordance with the present invention.

FIGS. 5 and 6 show example applications of the present invention to an IN-based call forwarding service. FIG. 5 shows a signal flow for a call forwarding service registration. The vertical lines represent the blocks shown in FIG. 2. In the call forwarding registration, the mobile subscriber dials a general IN service and reaches a user dialog service implemented using the specialized resource function (SRF). The SRF may be co-located with the SSF or implemented as a stand-alone network entity such as an Intelligent Peripheral (IP). An Initial Address Message (IAM) is sent in accordance with the ISDN User Part (ISUP). In response to the IAM message, the SSF sends an initial detection or trigger point message to the SCF using the well known SS7 Intelligent Network Application Part (INAP).

The service logic in the SCF implements user interaction procedures for registering a forwarded to number. In particular, the service logic requests the SSF to connect the calling mobile subscriber to the SRF, and the SRF prompts the mobile subscriber for input information. Interaction between the mobile subscriber and the SRF may be based on dual-tone multiple frequency (DTMF) tones sent from a telephone or a voice dialog in which the SRF has the capability of recognizing speech. Other possibilities for communicating this information, without establishing a call as in the present example, include using the short message service (SMS) or Unstructured Supplementary Service Data (USSD) available in the GSM.

The service logic in the SCF receives the new forwarded to number and determines in accordance with the present invention that it should request call barring data from the HLR. This request is made using an anytime interrogation (ATI) operation which in the present invention provides an extended data interface. If an Operator-Determined call Barring (ODB) service is active in the HLR, the HLR returns this ODB information to the service logic in the SCF. Based on the ATI result, the service logic in the SCF determines whether the forward-to number is permitted. In this way, a potential fraud, i.e., a subscriber who tries to register a restricted forwarded to number, is prevented. The service logic then informs the mobile subscriber in an appropriate way of the result in the requested registration.

In FIG. 6, an MCN call barring service has been activated after a mobile subscriber registered a call forward-to number with the IN-based call forwarding service. In this situation, the mobile subscriber receives an incoming call, the SSF tries to set up the call, and a trigger is detected in the SSF resulting in an initial detection point message being sent to the SCF. The SCF service logic checks the status of any active call barring services in the HLR using the MAP anytime interrogation as shown. The SCF service logic checks the stored, forward-to number in the IN database for that subscriber against the call barring information received from the HLR and determines whether the call forwarding should be allowed. If so, a connect signal is sent from the SCF to the SSF. In this way, the invention provides a secure interaction between the IN-based call forwarding and the MCN-based call barring services when the call barring service is activated after the subscriber has registered the call forward-to number for the IN-based call forwarding service.

Figure 7:
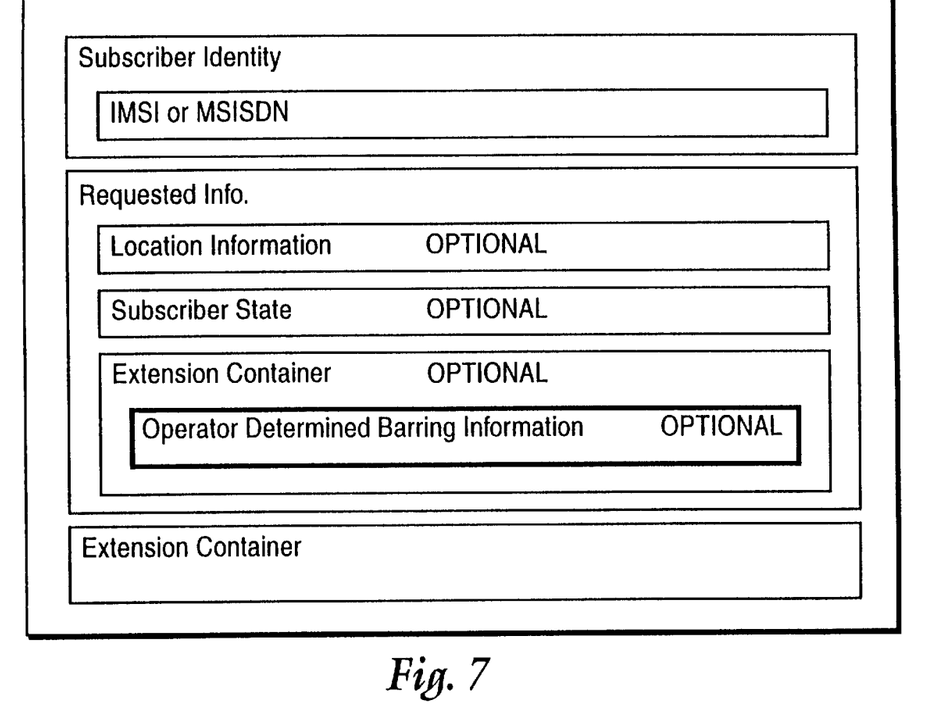
FIGS. 7 and 8 illustrate how an existing MAP Any Time Interrogation (ATI) message may be employed to implement the communications between the SCF and the HLR in the examples shown in FIGS. 5 and 6, respectively.
Figure 8:
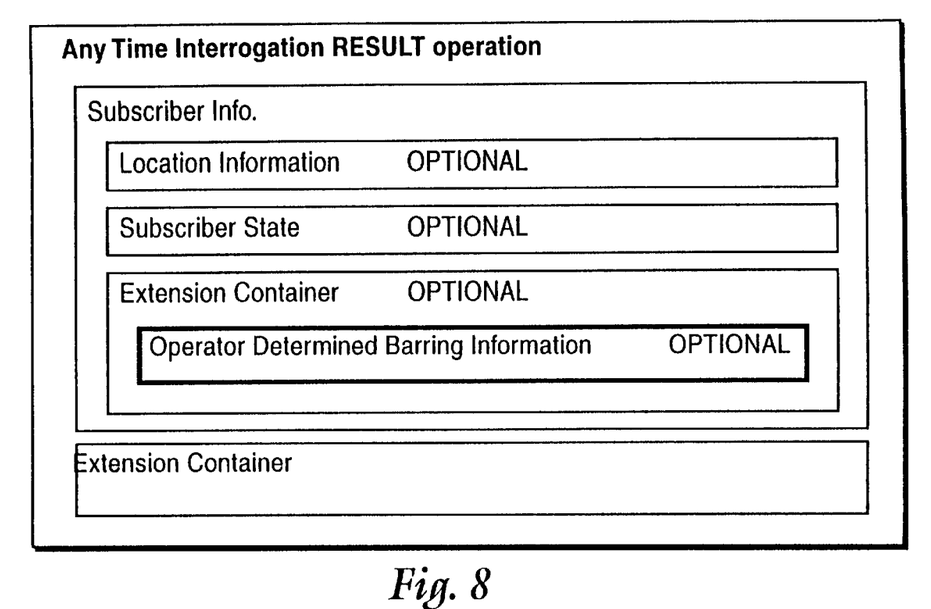

FIGS. 7 and 8 illustrate an example of how the standard MAP Any Time Interrogation (ATI) message, (provided in GSM MAP specification 09.02, version 5.5.0), may be employed to implement the invention in the context of requesting (by the SCP) and transferring (from the HLR) ODB information. The MAP ATI request message shown in FIG. 7 includes a subscriber identity field which contains the subscriber's MSISDN or IMSI number, a requested information field including location information, subscriber status, and extension container sub-fields, and an extension container field. The MAP ATI result message as shown in FIG. 8 includes a subscriber information field which contains location information, subscriber status, and extension container sub-fields and an extension container field. In the call forwarding-call barring example, the extension container sub-field is used to store the ODB parameter request and result information. Of course, other subscriber service information may be requested and returned using the extension container mechanism. The extension container sub-field, if not understood or recognized by the ATI receiving equipment, may simply be ignored. Alternatively, the ATI message format may be modified so that such parameter requests and results are standard.

Figure 9:
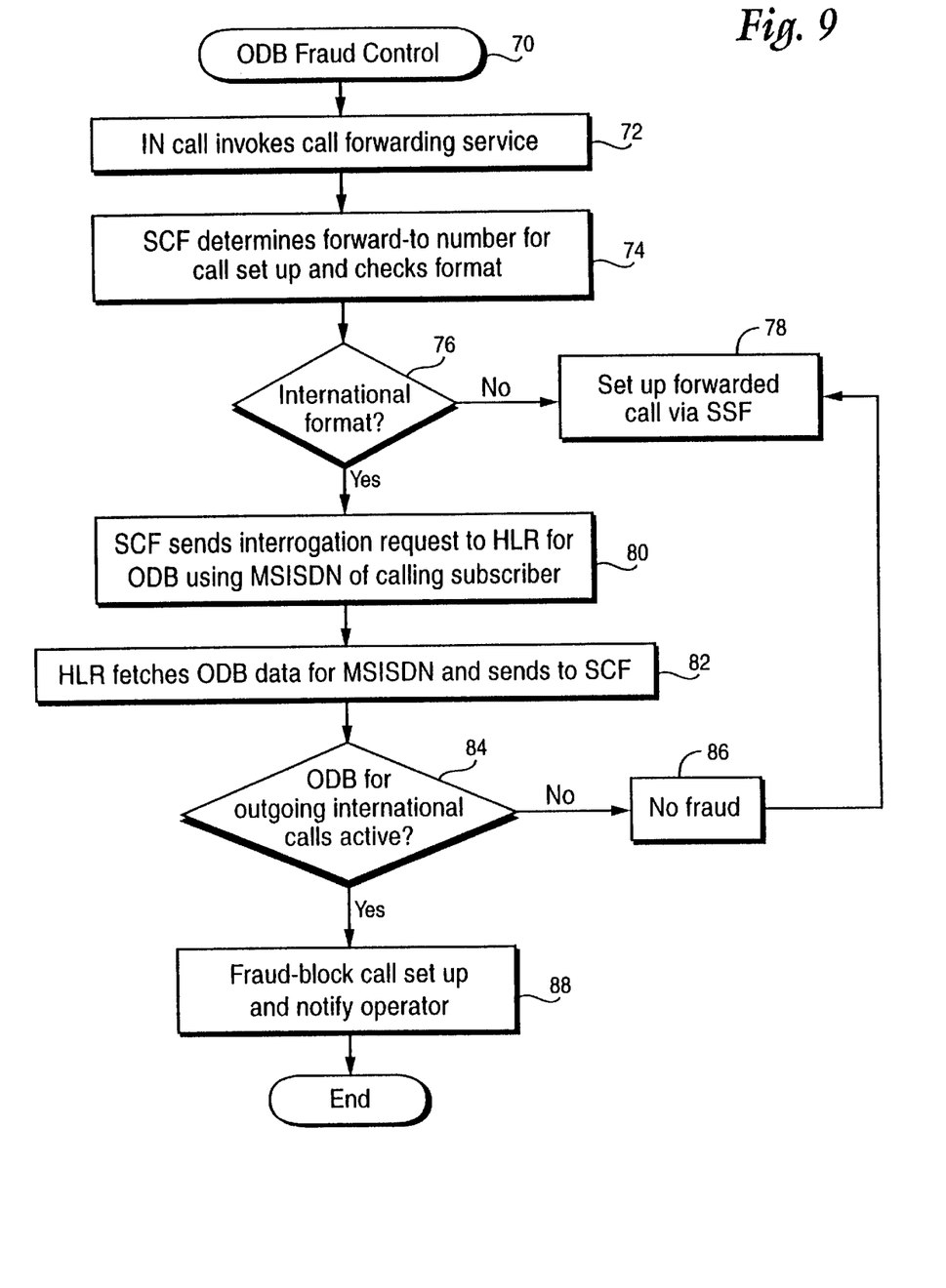
FIG. 9 is a flowchart diagram illustrating an example application of the present invention to monitoring and controlling possible, fraudulent circumvention of an Operator-Determined call Barring (ODB) MCN supplementary service.

FIG. 9 illustrates a specific example application of the present invention for detecting and preventing improper circumvention of an operator-determined call barring service in accordance with an ODB fraud control routine (block 70). An incoming call is received which invokes an IN-based call forwarding service at the SCF (block 72). The SCF determines the call forward-to number for a call setup and checks the format of the forward-to number (block 74). A decision is made (block 76) by the SCF service logic whether the forward-to number has an international format. If not, the SCF sets up the forwarded call via the SSF (block 78). If the forward-to number has an international format, the SCF sends an interrogation request to the HLR for ODB-type data using the MSISDN (or IMSI) of the calling mobile subscriber (block 80). The HLR fetches the requested ODB data for the particular mobile subscriber using the MSISDN to identify that mobile subscriber's database record (block 82). The HLR sends that ODB data to the SCF, and a decision is made (block 84) whether the ODB data indicates that outgoing international calls should be blocked. If not, a decision is made that no fraud has occurred (block 86), and the forwarded call is set up (block 78). Otherwise, it is determined that fraud has occurred, the call setup is blocked, and the service operator is notified (block 88).

The present invention provides automatic resolution of service interactions between MCN based supplementary services and IN based supplementary services. The disadvantages with manual checking of interactions between the MCN based supplementary services and IN based supplementary services are overcome. In the ATI example above, an existing standard mechanism in a GSM mobile network, i.e., the MAP ATI interface, is extended in a straightforward and cost effective manner to achieve such automatic service resolution.

While the invention has been described in connection with practical and preferred embodiments, it is to be understood that the invention is not to be limited to the disclosed embodiments, but on the contrary, is intended to cover various modifications and equivalent arrangements included within the spirit and scope of the appended claims. For example and as mentioned above, the present invention is not limited to GSM or IN-based systems.

What is claimed is:

1. A mobile communications system providing mobile communications services to mobile subscribers, comprising:
   a first database storing first subscriber information pertaining to the mobile subscribers;
   a first service provider, connected to the first database, providing a first supplementary service to one of the mobile subscribers using the first subscriber information stored in the first database for the one mobile subscriber;
   a second database storing second subscriber information pertaining to the mobile subscribers;
   a second service provider, connected to the second database, providing a second supplementary service to the one mobile subscriber using the second subscriber information stored in the second database for the one mobile subscriber;
   wherein the second service provider coordinates provision of the second supplementary service to the one mobile subscriber using some of the first subscriber information obtained from the first database for the one mobile subscriber to detect possible misuse of the second supplementary service.

2. The mobile communications system in claim 1, wherein the first subscriber information includes mobile network operator data and first supplementary service information.

3. The mobile communications system in claim 1, wherein the first subscriber information pertains to restricting a certain type of call that is not permitted for the one mobile subscriber and the second subscriber information pertains to forwarding calls.

4. The mobile communications system in claim 1, wherein the second service provider uses information from the first service provider data to modify the second supplementary service if possible misuse of the second supplementary service is detected.

5. The mobile communications system in claim 1, wherein the second service provider analyzes the first subscriber information from the first database and does not provide the second supplementary service if a possible misuse of the second supplementary service is detected.

6. A mobile communications system providing mobile communications services to mobile subscribers, comprising:
   a mobile communications network (MCN) database storing mobile identification and MCN subscriber information pertaining to the mobile subscribers;
   an MCN mobile switching center connected to the MCN database providing MCN-based services to one of the mobile subscribers using the MCN subscriber information stored in the database for the one mobile subscriber; and
   an Intelligent Network (IN) service control node including service logic providing an IN-based service,
   wherein the IN service control node coordinates provision of the IN-based service to the one mobile subscriber using some of the MCN subscriber information obtained from the MCN database for the one mobile subscriber to detect possible misuse of the IN-based service.

7. The mobile communications system in claim 6, wherein the IN service control node and the MCN database are separate nodes and the IN service control node interrogates the MCN database node regarding selected portions of the MCN subscriber information stored for the mobile subscriber pertaining to a MCN-based service related to the IN-based service.

8. The mobile communications system in claim 6, wherein the MCN subscription information includes mobile network operator data and supplementary service information.

9. The mobile communications system in claim 6, wherein the MCN subscriber information pertains to restricting calls.

10. The mobile communications system in claim 6, wherein the MCN database is a home location register (HLR) node that stores associated subscription information along with subscriber identification, status, and location information, and the IN service control node is a Service Control Point (SCP) that includes an IN database storing IN subscription information.

11. The mobile communications system in claim 10, wherein the communications between the HLR and the SCP are defined by a Mobile Applications Part (MAP) protocol.

12. The mobile communications system in claim 11, wherein a MAP Any Time Interrogation (ATI) message is extended to access MCN subscriber information from the MCN database for the one mobile subscriber.

13. The mobile communications system in claim 10, wherein the MCN subscriber information accessed from the HLR includes one or more of the following: a teleservice list, a bearer service list, operator determined call barring data, and supplementary service data.

14. The mobile communications system in claim 6, wherein the service control node analyzes the MCN subscriber information from the MCN database to modify the IN-based service if possible misuse of the IN-based service is detected.

15. The mobile communications system in claim 6, wherein the service control node analyses the MCN subscriber information from the MCN database and does not provide the IN-based service as a result of the analysis if possible misuse of the IN-based service is detected.

16. The mobile communications system in claim 6, wherein the service control node forwards an identifier corresponding to the one mobile subscriber to the MCN database and the MCN database returns an indication to the service control node for the subscriber whether there is a restriction pertaining to the IN-based service.

17. A method of providing services to mobile subscribers in a mobile communications network (MCN) including an MCN database storing subscriber information pertaining to the mobile subscribers, and a service control node associated with an Intelligent Network (IN) including service logic for selectively providing an IN-based services, comprising coordinating provision of the IN-based service to one of the mobile subscribers using MCN subscriber information obtained from the MCN database pertaining to the one mobile subscriber including:
  requesting from the database a parameter of the MCN subscriber information pertaining to the one mobile subscriber;
  analyzing the parameter returned from the MCN database; and
  determining if there is an attempt at misuse of the IN-based service,
  wherein if there is an attempt at misuse of the IN-based service, the service control node modifies or does not deliver the IN-based service.

18. The method in claim 17, further comprising:
  analyzing a call involving the one mobile subscriber;
  detecting a trigger of the IN-based service; and
  invoking the IN-based service at the service control node.

19. The method in claim 17, wherein the determining step includes:
  detecting whether a fraud has occurred based on the analyzing step.

20. The method in claim 17, wherein the IN-based service is a call forwarding service and the MCN subscriber information corresponding to the one mobile subscriber affects call forwarding, the call forwarding service being provided based on the MCN subscriber information.

21. The method in claim 20, further comprising:
  the service control node determining whether a call forwarding number associated with the IN-based call forwarding service conflicts with the MCN subscriber information.

22. The method in claim 20, wherein the MCN subscriber information includes an MCN Operator-Determined Call Barring (ODB) service.

23. The method in claim 22, further comprising:
  the service control node determining whether a call forwarding number associated with the IN-based call forwarding service is prohibited by the MCN ODB service.

24. The method in claim 17, further comprising:
  defining a communications interface between the service control node and the MCN database in accordance with a Mobile Applications Part (MAP) protocol, and
  extending a MAP Any Time Interrogation (ATI) message to access MCN subscriber information from the MCN database for the one mobile subscriber.

25. A method of providing services to mobile subscribers in a mobile communications network (MCN) including an MCN database storing subscriber information pertaining to the mobile subscribers, and a service control node associated with an Intelligent Network (IN) including service logic for selectively providing an IN-based services, comprising coordinating provision of the IN-based service to one of the mobile subscribers using MCN subscriber information obtained from the MCN database pertaining to the one mobile subscriber including:
  requesting from the database a parameter of the MCN subscriber information pertaining to the one mobile subscriber;
  analyzing the parameter returned from the MCN database; and
  determining if the IN-based service is consistent with the parameter returned by the MCN database,
  wherein the IN-based service is inconsistent with the parameter returned by the MCN database, the service control node modifies or does not deliver the IN-based service, and
  wherein the MCN subscriber information corresponding to the one mobile subscriber includes an MCN supplementary service and an MCN operator-initiated service.

26. In a mobile communications network (MCN) including an MCN database storing information pertaining to mobile subscribers, and a service control node associated with an Intelligent Network (IN) including service logic for selectively providing an IN-based service, a method for preventing improper procurement of mobile services, a method comprising the steps of:
  detecting an IN call involving a mobile subscriber;
  invoking the IN-based service in the service control node;
  the service control node sending an interrogation request to the MCN database along with an identifier corresponding to the mobile subscriber;

using the mobile subscriber identifier, accessing MCN database information from a subscriber record in the MCN database corresponding to the mobile subscriber;

returning the accessed MCN database information to the service control node, and determining whether there is a possible misuse of the IN-based service, and if not, modifying the IN-based service.

27. The method in claim 26, further comprising:

defining a communications interface between the service control node and the MCN database in accordance with a Mobile Applications Part (MAP) protocol, and extending a MAP Any Time Interrogation (ATI) message to access MCN subscriber information from the MCN database for the one mobile subscriber.

28. The method in claim 26, wherein the IN-based service is not provided when rendering the IN-based service would undermine a service provided by the MCN using the accessed MCN database information.

29. The method in claim 26, wherein the determining step includes determining whether a fraud has occurred based on the accessed MCN database information.

* * * * *